Figure 1:
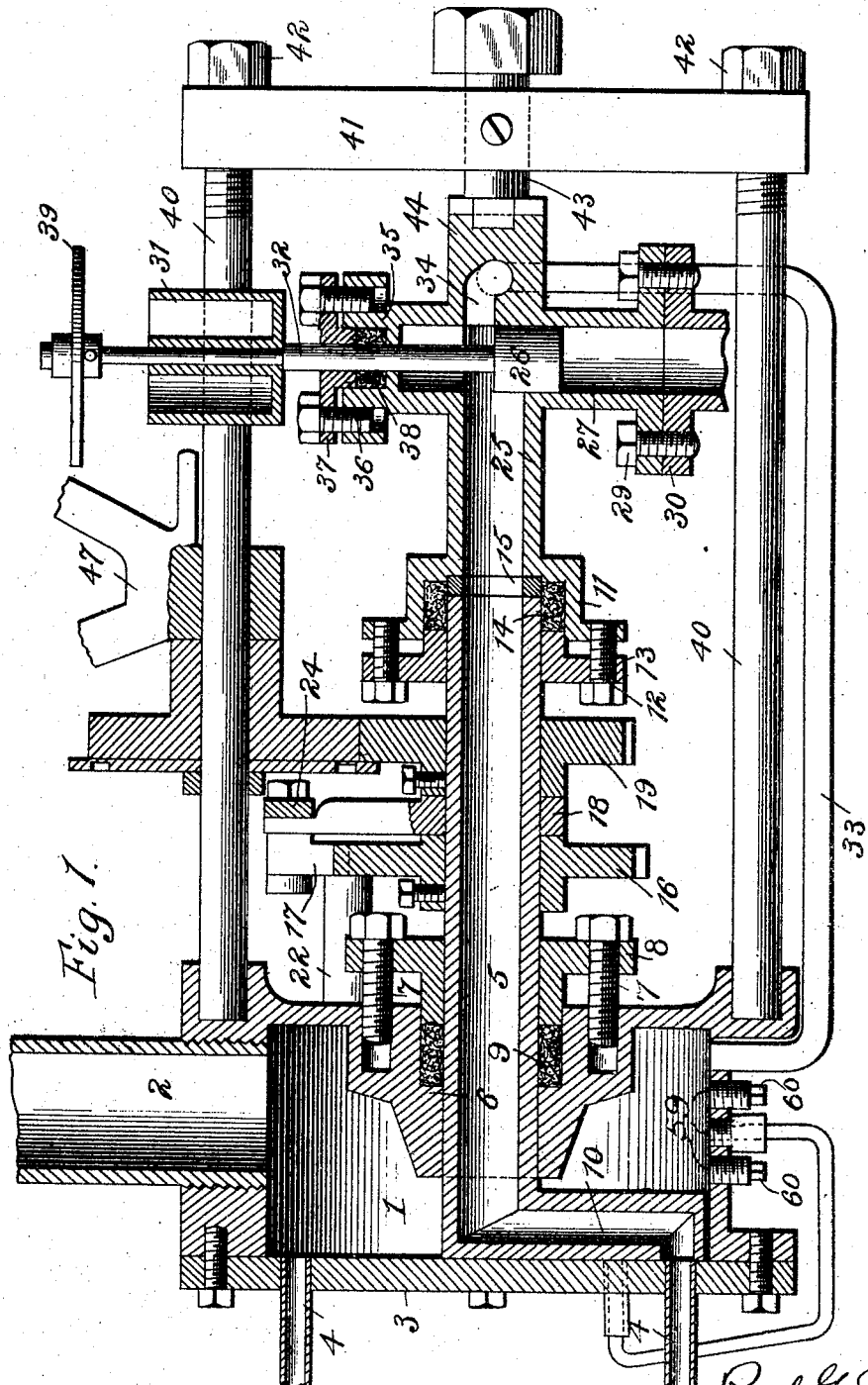

No. 780,839. PATENTED JAN. 24, 1905.
P. J. TISMER.
OILING DEVICE AND ALARM FOR ENGINES.
APPLICATION FILED APR. 4, 1904.
3 SHEETS—SHEET 2.
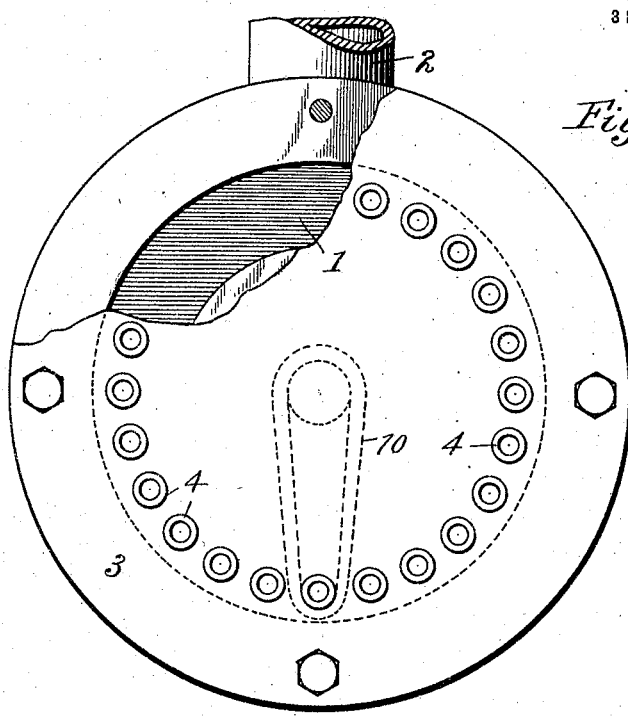
Fig. 2.
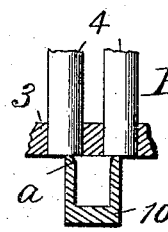
Fig. 2ª
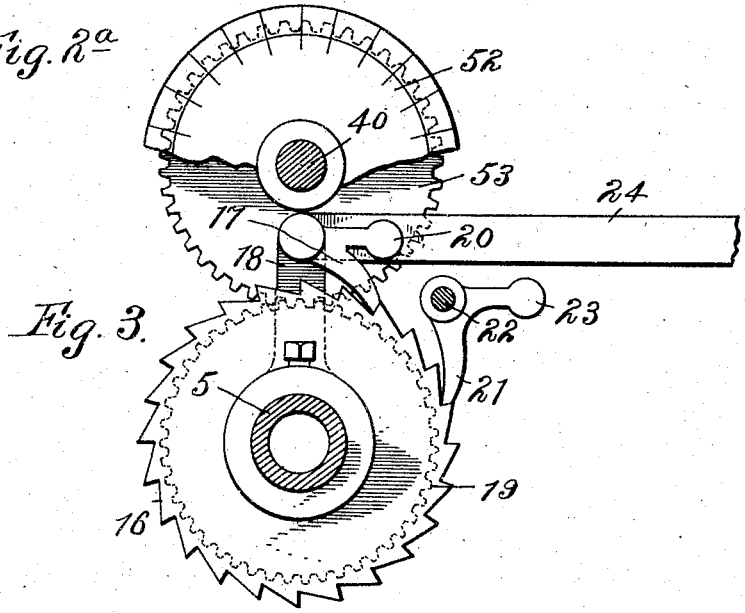
Fig. 3.
Witnesses
Samuel J. Hoexter
Wm. P. Hammond
Paul G. Tismer
Inventor
By his Attorneys Knight Bro.

No. 780,839. PATENTED JAN. 24, 1905.
P. J. TISMER.
OILING DEVICE AND ALARM FOR ENGINES.
APPLICATION FILED APR. 4, 1904.
3 SHEETS—SHEET 3.
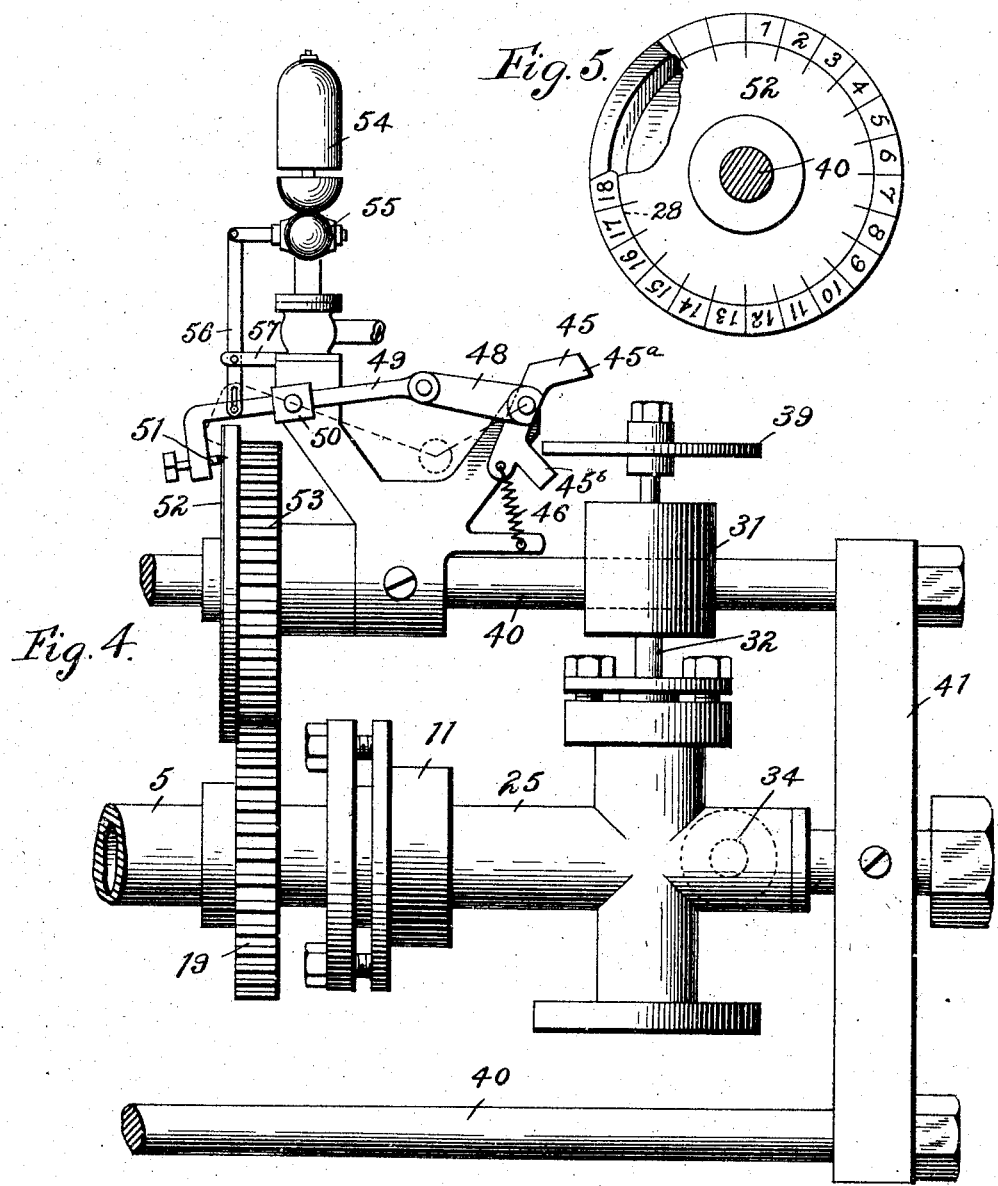

No. 780,839.   Patented January 24, 1905.

UNITED STATES PATENT OFFICE.

PAUL G. TISMER, OF DUNELLEN, NEW JERSEY.

OILING DEVICE AND ALARM FOR ENGINES.

SPECIFICATION forming part of Letters Patent No. 780,839, dated January 24, 1905.

Application filed April 4, 1904. Serial No. 201,511.

*To all whom it may concern:*

Be it known that I, PAUL G. TISMER, a subject of the Emperor of Germany, residing at Dunellen, in the county of Middlesex and State of New Jersey, have invented a new and useful Oiling Device and Alarm for Engines, of which the following is a specification.

My invention relates to devices for oiling or lubricating bearings, and may be applied to or used on any apparatus or engine having bearings or other parts to be oiled or lubricated, or it may be used for the lubrication of a number of apparatuses or engines. Where there are a number of bearings to be kept lubricated, the constant attention of specially-employed oilers is necessary in order to keep the machinery in proper running order.

It is the object of my invention to provide an apparatus which will conduct lubricant to any number of bearings and insure them being always kept in proper lubricated condition and which shall give timely notice or warning of any failure on the part of a bearing to receive its proper quantity of lubricant.

A further object of my invention is to provide in an apparatus of the above description an indicating means to indicate the particular bearing or bearings which are not receiving the proper quantity of lubricant and, further, to indicate the nature of cause of the failure.

A distinguishing characteristic of my invention is that warning and indication are given when the oil is not properly flowing to the bearing, so that the danger of a heated bearing is prevented. By my device a bearing is not permitted to get dry and heated before warning is given, for the danger is averted before it can occur.

Further objects of the invention will appear in the specification and be pointed out in the claims.

While my invention may be employed for oiling all kinds of machinery, I have shown and described the same in the following specification as applied to a steam-engine, it being understood that this application of the invention is merely illustrative.

In the accompanying drawings, Figure 1 is a sectional view of the oiling device, the warning and indicator being omitted for lack of proper space on the sheet. Fig. 2 is an end view of the device as shown in Fig. 1. Fig. 2$^a$ is a detail view of the device as shown in Fig. 1. Fig. 3 is a detail view illustrating the means for moving the testing device from bearing to bearing. Fig. 4 is a view showing the warning and indicating devices in their relative position as attached to the oiling device. Fig. 5 is a detail showing the indicating dial or chart.

Similar numerals of reference indicate corresponding parts in the several views of the drawings.

The device comprises a chamber 1, shown as cylindrical in form, having a pipe 2 entering the same, through which oil or other lubricating fluid is supplied under pressure of, say, twenty pounds to the square inch. The desired pressure may be obtained by gravity, as by connecting chamber 1 with an elevated tank. It will be understood that chamber 1 is formed with tight joints between its walls and faces, each joint made suitably compact to prevent leakage of the oil. In the outer face 3 of said chamber are pipes or ducts 4, arranged circumferentially of the face 3 of the chamber. These pipes may be sweated in place or secured by any other suitable and equivalent means which will give tight connections. There are as many pipes 4 as there are bearings to be oiled, and each of these pipes leads direct to a bearing. Through the opposite face of the chamber 1 is led a pipe or conduit 5, which passes through a stuffing-box 6, formed in said face of the chamber 1, the stuffing-box being provided with the usual adjusting-screws 7 and gland 8 and the joint between the pipe and the casing being suitably packed with packing 9. The pipe 5 has an offset portion 10 of such length as to register with the pipes 4, leading from the chamber to the bearings. The other end of the pipe 5 terminates in another stuffing-box, 11, provided with the usual adjusting screws or bolts 12, gland 13, and packing 14. On this end of pipe 5 is formed a steel bearing-ring 15. Secured fast on said pipe 5 is a ratchet-wheel 16, with the teeth of which is engaged a pawl 17, pivotally mounted upon an arm 18, having a bearing upon pipe 5 and free to oscillate thereon. The arm 18 is held in contact with the ratchet 16 by a gear 19, secured fast upon pipe 5, whereby such relation is maintained between the arm 18 and the ratchet 16 that the pawl 17 will always be in engagement with the ratchet-teeth of the ratchet 16. The pawl 17 has a weighted arm 20, (see Fig. 3,) which acts by gravity to keep the pawl in engagement with the teeth of the ratchet. A locking-pawl 21 is mounted upon a stud 22, secured in the rear face of the chamber 1 in such manner as to engage the teeth of the ratchet. Said pawl 21 is also provided with a weighted arm 23, acting by gravity to maintain the pawl 21 in engagement with the teeth of the ratchet. Pivotally attached to the arm 18 is a connecting-rod 24, having its other end connected with any convenient reciprocating part of the engine, whereby an oscillating movement is communicated to the arm 18, so that the pawl 17 is moved or carried from one tooth of the ratchet 16 to the next. By this means a step-by-step rotary movement is given to the ratchet 16 and the pipe 5. The pawl 21 drops into the teeth of the ratchet 16 and prevents back movement. The teeth on the ratchet 16 are so spaced that each step-by-step movement thereof corresponds to the distance between the pipes 4, leading to the bearings. By this means the offset 10 of pipe 5 is carried from registry with one of the pipes 4 to the next. The end of the offset 10 forms close contact with the inner face 3 of the chamber 1, so that substantially no leakage occurs between said offset and the inner face 3 of the chamber when the same is in registry with any of the pipes 4. In intermediate positions between adjacent pipes 4 the oil discharges from the offset 10 into the chamber 1. To enable this to take place, the end of the offset is beveled or chamfered, as shown at $a$, Fig. 2$^a$, so as to afford a discharge from the offset when passing from one pipe 4 to the next. In line with pipe 5 is a connection 25, leading from a valve-chamber 27. This valve-chamber 27 communicates with a second source of oil-supply through a connection which may be secured to said valve-chamber by means of the usual bolt-and-flange connection 29 30. Oil is supplied from this second source of supply preferably at an increased pressure—say at forty pounds to the square inch—the pressure being generated, preferably, by means of a rotary pump (not shown) geared to the engine, so that both the oil-pump and the engine may start and stop together. The oil from this second source of supply in order to reach the pipe 5 must displace the valve 26. This valve is a floating or balanced valve and is provided with a chamber or receptacle 31, mounted on a valve-stem 32, by means of which the valve may be weighted to act at any desired pressure. A convenient means of weighting may be shot or lead inserted in the receptacle 31. A by-pass 33 communicates from the chamber 1 to the valve-chamber 27 through a port 34. The valve rod or stem 32 passes through a stuffing-box 35, provided with the usual adjusting-bolts 36, gland 37, and packing 38, and has secured at its upper end a plate 39, preferably circular in form. The valve-chamber and adjacent parts are supported by suitable tie-rods 40 40, passing into lugs or flanges formed on the casing 1. A yoke-piece 41 is threaded over the ends of the tie-rods 40 and the whole held in position by nuts 42. A thrust-rod or bolt 43 passes through the yoke 41 and enters a lug 44, formed on the valve-casing 27 to hold the conduit and offset in close contact with face 3 of the chamber 1 and to permit adjustment for wear, &c.

The plate 39, attached to valve-rod 32, is arranged to engage trip 45. (See Fig. 4.) The trip 45 is provided with two arms 45$^a$ 45$^b$, which are arranged to be engaged by the plate 39. The trip is pivotally mounted upon a Y-shaped support 47, secured in suitable position on the tie-rod 40. A spring 46 is connected by one end to a lower extension of trip 45 and by its other end to a projecting portion of a support 47. This spring is connected in such a way that it normally tends to hold the trip 45 in a middle position and tends to return it to the said middle position after it has been oscillated by the plate 39 striking one of the arms 45$^a$ or 45$^b$. Attached fast to the trip 45 is one arm, 48, of a toggle, the other arm, 49, of which passes through oscillating bearing 50, in which arm 49 slides. The arm or link 49 of the toggle bends downwardly at its free end and carries an adjustable pin or point 51 in position to engage a scale, chart, or dial 52, mounted upon the face of a gear 53. The gear 53 is mounted upon the tie-rod 40 in a position to mesh with the gear 19 and to be rotated thereby by the same amount. The chart or scale 52 is shown in face view in Fig. 5 and is divided into a series of sectors or divisions 1 2 3 4, &c. These divisions correspond to and represent the bearings on the engine to be lubricated, it being understood that each bearing on the engine is given a number and that these numbers are represented upon a chart or dial 52. The sectors 1 2 3 4, &c., on the dial are divided into two divisions by a circumferential line 58, the purpose of which will hereinafter appear.

A whistle or other alarm 54 is mounted adjacent the toggle-arms 48 and 49 and on the engine side of the throttle-valve and is supplied with steam from the engine or boiler. The whistle is supplied with a suitable valve 55, which is operated from the toggle-arms 48 49 through the following connections: The arm 49 is pivotally connected near its end with a lever 56, fulcrumed upon an extension 57. The upper end of lever 56 is pivotally connected to the slide-valve 55 of the whistle. The longitudinal movement of arm 49 oscillates lever 56 and opens the whistle-valve.

The operation of the device is as follows: The oil-supply is turned on through the connection 2 to the chamber 1. This oil being at a pressure of, say, twenty pounds to the square inch flows through all the pipes 4, including the one in registry with the offset portion 10 of the pipe 5, to all of the bearings connected therewith. In order to reach the bearing connected with the pipe 4, which is in registry with the offset 10, the oil passes through the by-pass 33 to the port 34 and through the connection 25, pipe 5, offset portion 10 to the pipe 4 in registry therewith. Steam being now turned on, the engine alarm-whistle will sound, since the trip 45 is out of central position, its lower arm $45^b$ being struck by the plate 39 when it came to rest in the lowest position of the valve, as shown in Fig. 4. The rotary pump or other device for generating the oil-pressure supplied to the valve-chamber 27 being connected with the engine also starts to operate, and the oil-pressure at this point is developed to the desired amount—say forty pounds pressure to the square inch. This pressure is sufficient to raise the valve 26 against the weight of receptacle 31. The movement of the engine also rotates the pipe 5 and offset 10, moving the latter step-by-step from one pipe 4 to the next. When valve 26 is raised by the oil-pressure entering the valve-chamber 27, port 34 of the by-pass is closed and communication from the valve-chamber 27 to the pipe 5 and offset 10 is opened. The movement of the valve 26 raises the plate 39 and allows the spring 46 to move trip 45 into its middle position, thereby closing the whistle-valve 55, thus informing the engineer that the oiling device is operating properly and oil is being delivered at high pressure to one bearing after another successively. This is the normal position of the piston in operation. This high pressure insures the certain delivery of the oil through the pipes 4 to the bearings and is of the nature of a test applied to the oil-pipes successively. It also serves to clear the pipes of obstructions having a tendency to lodge therein and choke them. Should the pressure of the oil supplied to valve-casing 27 fall for any reason, the valve 26 will drop and the plate 39 in its downward movement will strike the lower arm $45^b$ of the trip 45 and again open the whistle-valve 55, thereby notifying the engineer that the device is not properly operating. Oil, however, continues to flow to the bearings from the connection 2, chamber 1, and by-pass 33, as before.

Assuming that the device has been started and is operating satisfactorily, should oil for some reason fail to reach one of the bearings connected to pipes 4 or reach it only in an inadequate amount by reason of a leak or break in the pipe 4, when the offset 10 comes round to the defective pipe 4 the device will at once indicate this, since the pressure of the oil flowing through pipe 5 and the offset 10 will at once drop. This will allow the valve 26 to fall and close the opening from the valve-chamber 27 to the pipe 5, at the same time opening port 34. The drop of the valve causes the plate 39 to strike and shift the trip. The movement of the trip opens the whistle, thereby calling the engineer's attention to the defect. The movement of the trip also operates the toggle-arms 48 49 to cause the end of the toggle 49 carrying the point 51 to move toward the dial and pierce the same. This inward movement of the point 51 is caused by the shortening of the toggle resulting from the upward movement or breaking of the toggle-joint. The dial being rotated through the gears 53 and 19 in unison with the offset 10, a perforation is made at a point on the dial corresponding to the pipe 4, with which the offset 10 registers at the moment the pressure drops. Thus a perforation or mark is made in that section of the dial which is numbered to correspond to the number of the defective pipe and bearing. The perforation is, moreover, made on the inner side of line 58 on the dial, since by the upward movement of the toggle-joint the end of the toggle-link 49 carrying the pin is slightly depressed, the depression being sufficient to bring the point below or inside the line 58. Thus the dial not only indicates to the engineer which particular pipe is defective and which particular bearing is not receiving oil, but it also indicates the nature of the defect—viz., that the valve 26 is in its lowest position caused by the drop of the pressure, which can only result from a leak of the oil from the pipes. The injury is therefore at once located and can be remedied. Pending repairs the bearing may be lubricated by hand. The defect is noted before the bearing can become dry and overheated.

Should for any reason one of the pipes 4, leading to the bearings, become partially or totally clogged or obstructed, the pressure in valve-casing 27 will rise above normal, when the offset 10 registers with that pipe. The valve 26 will then be raised to its highest position, uncovering port 34 and allowing the oil to find its way through pipe 33 into chamber 1. The plate 39 will strike the upper arm $45^a$ of the strip 45. The whistle-valve will be opened through the connection above described and the engineer's attention will be called. The toggle-link 48 will be moved downwardly to the position shown in dotted lines in Fig. 4, and the point 51 will be drawn toward the dial or chart 52, and a puncture or mark will be made in the correspondingly-numbered sector on the dial. In this movement the end of link 49 carrying the point will be slightly elevated and will register its puncture outside of the line 58, thereby indicating the nature of the defect, as an obstructed pipe, since the puncture can only be made outside the line 58 when the valve 26 is raised to its upper position. The increased pressure applied to the testing device is for the purpose of clearing the oil connections of obstructions. When the pressure is insufficient to accomplish this, the floating valve operates to sound the alarm and mark the dial or chart. It is not essential that increased pressure be employed in the testing device, as the apparatus will work at any desired pressure.

The plate 39, which operates the trip 45, is circular in form, so that any rotary movement of the valve will not affect the engagement of said plate with the trip.

In case the number of bearings in use or to be lubricated by the device is less than the number of pipes 4 with which the device is equipped the extra pipes 4 are conducted back to the chamber 1 through openings 59. These openings are closed when all of the pipes 4 are utilized by means of screw-plugs 60. When any of the pipes 4 are connected back to the openings 59, the connecting-pipes should be of smaller diameter enough to furnish a counter-pressure to the oil-pressure flowing through the pipe 5 and to keep the valve 26 floating, or, if desired, two connections 4 may be led to one bearing.

When the engine is slowed down for a shut-down, the pressure of the oil in valve-casing 27 drops, and the whistle will blow, the force-pump will stop with the engine, and the oil-supply at 2 is shut off by hand.

The opening in the end of the offset 10 is chamfered so as to be of a greater diameter than the width of the metal of the casing 3 between the pipes 4, so that in passing through the intermediate position between the pipes 4 the oil coming through the offset 10 will find escape into the chamber 1.

In order to prevent marking the dial in starting and stopping of the engine, the link 49 may have its end swung clear of the paper dial 52 by hand.

It will be understood that the dial should be replaced from time to time by a fresh one.

With the above-described invention engines of large sizes and containing a great number of bearings may be positively and certainly lubricated and kept lubricated, this avoiding stops and breakdowns, which in engines of the class referred to is a very serious matter, and all the oiling may be attended to by one man with greater certainty than is at present done by employing several oilers, whose duty it is especially to inspect the bearings.

My device forms a desirable attachment for marine engines, in which in many cases the bearings are in inaccessible parts of the engine, necessitating considerable bodily risk and danger to the oiler in attempting to reach them, owing to the motion of the vessel and the moving parts of the engine.

My invention may be used not only for feeding or supplying the lubricant in a continuous stream, as illustrated and described, but it may also be employed where the oil is desired to be delivered to the bearings drop by drop and in regulated quantities. The oil-ducts leading to the bearings may have sight-feed and needle-valve attachments of well-known construction attached thereto in order to view and regulate the feed, or the oil-cups may be such as to regulate the feed drop by drop to the amount desired. Where this manner of oiling is employed, it will be understood that the oil is fed by gravity to all the bearings with sufficient pressure to keep the ducts filled. The offset 10, which forms the tester, delivers oil under pressure, and this added pressure forces a small stream through the needle-valves and clears the same periodically and regularly, and thus prevents them from clogging, while at the same time the ducts are tested for leaks or obstructions, as described above.

The particular kind of feed-controlling device or oil-cups employed form no part of my invention, and the above description is given merely to illustrate the adaptability of my invention for various methods of lubrication. It will further be understood that it is immaterial what kind of fluid is employed in the device and that other fluids than oil may be used therein without departing from the invention.

My invention may work either automatically or otherwise. For instance, the testing device or offset 10 may be operated by hand instead of mechanically, as above described and shown, without departing from the invention.

Having thus described my invention, the following is what I claim and desire to secure by Letters Patent:

1. An oiling device comprising ducts for distributing oil, and indicating means correspondingly severally to the ducts for indicating an abnormal condition of flow in any one of said ducts.

2. An oiling device comprising ducts for distributing oil, means for giving notice of an abnormal condition of flow in any of said ducts, and means for indicating the duct in which the abnormal condition exists.

3. An oiling device comprising ducts for distributing oil, means for giving notice of a defective condition in any of said ducts, means for indicating the defective duct, and means for indicating the character of the defect.

4. An automatic oiling device, comprising means to supply oil to bearings; means automatically operating to test the connections between the bearing and the oil-supply, and means to indicate a defective condition of any of the oil connections.

5. An automatic oiling device, comprising means to supply oil to bearings; means automatically operating to test the connections between the bearings and the oil-supply; and means to give warning or notice of an abnormal condition of any of the oil connections.

6. An automatic oiling device, comprising means to constantly supply bearings with oil, and means automatically operating to test the supply connections periodically; an alarm means operating when defects occur in the oil connections; and an indicating-dial, and means coöperating therewith to indicate upon said dial the defective connection.

7. An automatic oiling device, comprising a source of oil-supply; a connection leading from said source of supply to each of the bearings to be lubricated; automatically-operated means for testing each of said connections successively, and means to indicate a leak or break in said connections.

8. An automatic oiling device, comprising a source of oil-supply, a connection leading from said source of supply to each of the bearings to be lubricated; automatically-operated means for testing each of said connections successively, and means to give warning of a leak or break in said connections.

9. An automatic oiling device, comprising a source of oil-supply, connections leading from said source of supply to each of the bearings to be lubricated; automatically-operated means for testing each of said connections successively, and means to indicate an obstruction in said connections.

10. An automatic oiling device, comprising a source of oil-supply, connections leading from said source of supply to each of the bearings to be lubricated; automatically-operated means of testing each of said connections successively, and means to give notice or warning of an obstruction in said connections.

11. An automatic oiling device, comprising a source of oil-supply, connections from said source of supply to the bearings to be oiled; automatically-operated means for testing each of said connections periodically; means to give notice or warning of obstructions to the flow of oil in said connections and means to indicate the obstructed connection.

12. An automatic oiling device, comprising a source of oil-supply, a connection for conducting oil from the source of supply to each of the bearings to be oiled, a testing device for testing the connections and automatically-operated means to apply the testing device to each of said connections periodically, a dial or chart mounted to move with the testing device and having spaces or divisions thereon corresponding to the several connections, and means for indicating on the chart a defective connection.

13. An automatic oiling device, comprising a source of oil-supply, a connection for conducting oil from the source of supply to each of the bearings to be oiled, a testing device for testing the connections and automatically-operated means to apply the testing device to each of said connections periodically, a dial or chart mounted to move with the testing device and having spaces or divisions thereon corresponding to the several connections, means for indicating on the chart a defective connection and the nature of the defect.

14. An automatic oiling device, comprising a source of oil-supply, a connection leading from said source of supply to each bearing to be oiled, a testing device for each of said connections, automatically-operated means to apply said testing device to each of said connections in succession, a dial or chart mounted to move with the testing device and having spaces thereon corresponding to the several connections, and means connected with the testing device to automatically indicate on the dial a defective connection and to sound an alarm to call attention to the defect.

15. An automatic oiling device, comprising a source of oil-supply, connections for oil from the source of supply to each of the bearings to be oiled, a testing device comprising an oil-conduit and means to apply the testing device to each of the connections in succession, a valve controlled by the oil-pressure in the testing device, and an alarm operated by connections from said valve to give warnings of defects in the oil connections.

16. An automatic oiling device, comprising a source of oil-supply, a series of connections leading from said source of supply to the bearings to be oiled, a testing device for said oil connections, consisting of a movable oil-conduit, and means to move said conduit into registry with each of said oil connections in succession, an automatic valve in said conduit; and means attached to said valve to operate an alarm when a defect occurs in any of said oil connections, and a registering device operated by means of said valve to indicate a defective connection.

17. An automatic oiling device, comprising a chamber to contain oil under pressure, a series of connections leading from said chamber to the bearings to be oiled, a testing device for said oil connections, consisting of a movable conduit for oil under pressure, and means to move said conduit into registry with each of said oil connections in succession, an automatic valve in said testing-conduit and means attached to said valve to operate an alarm when a defect occurs in any of said oil connections.

18. An automatic oiling device, comprising a source of oil-supply, connections for conducting oil from the source of supply to each of the bearings to be oiled, a testing device comprising a conduit for oil, means to move said conduit into registry with the oil-supply connections successively, a dial or chart connected to said conduit to move in unison therewith, an automatic pressure-controlled device, actuated by the pressure in the testing device and means operated by the pressure-controlled device to mark the dial when a defect occurs in the oil-supply connections.

19. An automatic oiling device, comprising a source of oil-supply, connections for conducting oil from the source of supply to each of the bearings to be oiled, a testing device comprising a conduit for oil, means to move said conduit into registry with the oil-supply connections successively, a dial or chart connected to said conduit to move in unison therewith, an alarm, an automatic pressure-controlled device, actuated by the pressure in the testing device, and means operated by the pressure-controlled device to mark the dial and sound the alarm when a defect occurs in any of the connections.

20. An automatic oiling device, comprising a chamber for containing oil under pressure, connections leading from said chamber to the bearings to be oiled, a conduit passing through said chamber and adaped to register with any of said connections, means to move said conduit into register with each of said connections successively, means to supply oil under increased pressure to said conduit, a valve in said conduit adjusted to float at the pressure applied to said conduit, and means operated by said valve to give notice of a bearing not receiving proper lubrication.

21. An automatic oiling device, comprising a chamber for containing oil under pressure, connections leading from said chamber to the bearings to be oiled, a conduit passing through said chamber and adapted to register with any of said connections, means to move said conduit into register with each of said connections successively, means to supply oil under increased pressure to said conduit, a valve in said conduit adjusted to float at the pressure applied to said conduit, and means operated by said valve to operate an alarm and a registering device.

22. An automatic oiling device, comprising a chamber to receive oil under pressure, a series of connections leading from said chamber to the bearings to be oiled, said connections arranged in a circle in the wall of said chamber, a conduit passing through said chamber and provided with an offset registering with the said connections, means connected with a moving part of the engine to rotate said conduit and offset from registry with one connection to register with the next in succession, a dial or chart and means to rotate the same in unison with the rotation of the conduit or offset, a valve-chamber connected with said conduit, means to supply oil under increased pressure to said valve-chamber, a valve in said valve-chamber, means to adjust said valve to float at a predetermined pressure and when in floating condition to open communication from the valve-chamber to the conduit, an alarm-signal, and means connected with said valve to operate said signal and to mark said chart or dial to indicate a defective condition of any of said connections.

23. An automatic oiling device, comprising a source of oil-supply, connections for oil from the said source of supply to each of the bearings to be oiled, a testing device for said connections, said testing device comprising a conduit for conveying oil under pressure; a branch from said conduit arranged to register with each of the connections of the several bearings; means to move said branch into registry with each of said connections successively, said means connected with a moving part of the machine or engine to be oiled, a dial or chart connected with said testing device to move in unison therewith, a valve-chamber connected with said testing device, a valve in said chamber and means to adjust the same in accordance with the pressure in the testing device and means operated by said valve to mark the dial to indicate a defective oil-supply connection.

24. An automatic oiling device, comprising a source of oil-supply, connections from the said source of supply to each of the bearings to be oiled, a testing device, comprising a conduit for conveying oil under pressure and means to move said conduit into registry with each of said oil-supply connections in succession, and means for relieving the oil-pressure when any one of the oil-supply connections becomes choked or clogged.

25. An automatic oiling device, comprising a chamber, a series of distributing-pipes leading from said chamber, a testing device for testing said distributing-pipes, means to supply oil to said chamber and testing device and means for connecting one or more of the distributing-pipes back to the chamber, substantially as and for the purpose set forth.

PAUL G. TISMER.

Witnesses:
HARRY E. KNIGHT,
HENRY C. WORKMAN.